(12) United States Patent
Acharya (10) Patent No.: US 6,694,061 B1
(45) Date of Patent: Feb. 17, 2004

(54) MEMORY BASED VLSI ARCHITECTURE FOR IMAGE COMPRESSION

(75) Inventor: Tinku Acharya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1034 days.

(21) Appl. No.: 08/885,415

(22) Filed: Jun. 30, 1997

(51) Int. Cl.[7] .............................. G06K 9/36; G06K 9/46; G06K 9/38
(52) U.S. Cl. ........................ 382/251; 382/238
(58) Field of Search ................. 382/238, 251, 382/253; 348/409, 414, 417, 418, 422, 394.1, 409.1, 414.1, 417.1, 418.1, 422.1; 375/240.03, 240.12, 240.22

(56) References Cited

U.S. PATENT DOCUMENTS

| | | | |
|---|---|---|---|
| 4,725,885 A | * 2/1988 | Gonzales et al. | 348/411 |
| 4,965,580 A | * 10/1990 | Tasaki et al. | 341/200 |
| 5,124,790 A | 6/1992 | Nakayama | |
| 5,295,077 A | 3/1994 | Fukuoka | |
| 5,325,126 A | 6/1994 | Keith | |
| 5,341,442 A | * 8/1994 | Barrett | 382/166 |

FOREIGN PATENT DOCUMENTS

EP    0 324 584 B1    11/1995

OTHER PUBLICATIONS

Translation of First Office Action dated Jun. 3, 2002, in re German Patent Application 198 82 508.0–53.

* cited by examiner

Primary Examiner—Phuoc Tran
(74) Attorney, Agent, or Firm—Blakely, Sokoloff, Taylor & Zafman LLP (57) ABSTRACT

An image compression apparatus is discussed that includes a first look-up table providing a quantized code, a second look-up table providing the length of that code, and a predictive coding circuit which generates an address for indexed those look-up tables.

11 Claims, 4 Drawing Sheets

MEMORY BASED VLSI ARCHITECTURE FOR IMAGE COMPRESSION

BACKGROUND OF THE INVENTION

1. Field of the Invention

The invention relates generally to the field of image processing and computer graphics. More specifically, the invention relates to architectures and methods for performing image processing and compression.

2. Description of the Related Art

In small or portable devices such as digital cameras, the goal of image compression is to reduce the storage and processing requirements of the data while still maintaining acceptable picture quality. When storage and processing requirements are reduced, the overall power consumption of the camera is also reduced since the VLSI (Very Large Scale Integration) chip performing the processing is more compact. The reduction of the bit rate for transmission or storage of still image and motion video will also speed the process of capturing images and then, downloading them to a PC (personal computer) or other more complex data processing system.

Image compression techniques whether performed by hardware such as VLSI or otherwise by software can be classified as either "lossy" or "lossless". With lossless compression, the original image prior to compression can be retrieved exactly when the compressed image is decompressed. Consequently, lossless techniques, whose compression ratios depend upon the entropy of an image, do not achieve high compression ratios and, since they preserve a high percentage of original image information, are computationally expensive. By contrast, lossy compression provides only an approximation of the original image. Thus, with lossy compression, greater compression ratios can be achieved but with loss in image quality compared to lossless techniques. One such lossy technique referred to as "predictive coding" (also called Digital Pulse Code Modulation (DPCM) which is well-known in the art) predicts the value of a successive pixel by linearly combining the properties of already processed neighboring pixels. An error pixel is defined as the difference between the original image pixel and the corresponding predicted pixel. The error pixel, is quantized and then binary encoded. Traditionally, the quantization has been performed distinct from the encoding, which lends to complexity in the processing circuitry or software algorithm.

The implementation of such computationally intensive techniques demands more VLSI circuitry than is suitable for digital cameras and portable, small devices desiring image compression. Thus, there is a need for simpler architecture to perform these techniques while conserving power and preserving the accuracy of the compression technique.

SUMMARY OF THE INVENTION

An image compression apparatus is disclosed that includes a first look-up table providing a quantized code, a second look-up table providing the length of that code, and a predictive coding circuit which generates an address for indexed those look-up tables.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
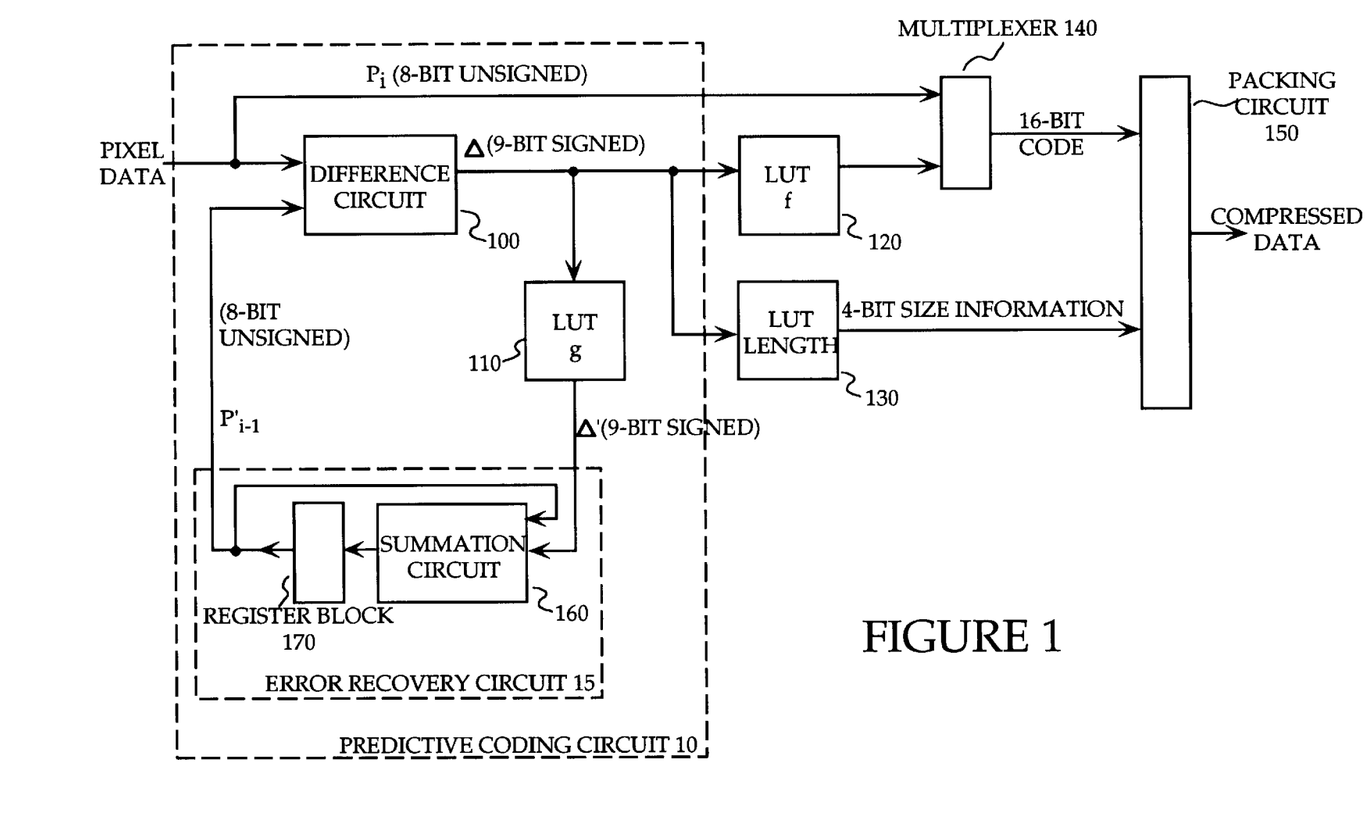
FIG. 1 is a block diagram of one embodiment of the invention.

FIG. 1 is a block diagram of one embodiment of the invention.

FIG. 1 represents a table look-up based image compression system. FIG. 1 is distinguishable from prior art image compression systems in several ways. First, a special predictive coding or adaptive decorrelation circuitry is utilized and second, look-up tables are employed to perform quantization and binary encoding in an integrated manner. Prior art systems did not use integrated quantization and encoding look-up tables, and do not use look-up table based predictive coding as will be described herein. The apparatus of FIG. 1 is advantageous in that the look-up tables may be implemented as RAM (Random Access Memory) and are, thus, less expensive and less consumptive of power than prior art systems that employ circuitry. Though FIG. 1 shows one implementation of look-up table compression, it is merely exemplary. One skilled in the art can readily adapt the look-up table architecture to any image or data compression system.

FIG. 1 shows as input pixel data $P_i$ which originates from a scaling device or other components of an image capture device or port configured to communicate image information. The pixel data $P_i$ represents the value(s) associated with defining a pixel in the image that compression is performed upon. This may be a single value which represents color, such as R(red), G(green) and B(blue) color plane component or a grouping of such values. Typically, each $P_i$ is a pixel "component" (R, G or B), and is interpolated together with neighboring components to form a single screen renderable RGB mixed pixel. The mixing of pixel components is usually achieved when the image is finally output to a display or printer.

Each $P_i$, which is shown as an 8-bit unsigned value is input to a difference circuit 100. Difference circuit 100 computes the difference between a predicted previous pixel component $P'_{i-1}$ and the original pixel component $P_i$. The difference circuit 100 generates and provides as output a 9-bit signed value $\Delta = P_i - P'_{i-1}$, which is referred to as the "error" or delta value in the art of predictive coding and image compression. As discussed below, each pixel component $P_i$ has a previous predicted pixel component $P'_{i-1}$ provided by the predictive coding circuit. The previous predicted pixel component $P'_{i-1}$ is fed into the difference circuit for the next on future pixel component $P_i$.

A predicted pixel component $P_i'$ is generated by associating in linear combination previously visited neighboring pixel components. In predictive coding, any number of neighboring pixel component may be utilized to predict pixel component values. For instance, the one-dimensional predictive coding takes on one of either the north neighbor (same column, previous row) or the west neighbor (same row, previous column). Two dimensional predictive coding involves, for example, both north and west neighboring pixels. The exemplary embodiment of FIG. 1 shows one-dimensional predictive coding based on the west neighbor pixel.

Predictive coding circuit 10 operates as follows. Difference circuit generates a $\Delta$, which is 9-bit signed value representing the difference between $P_i$ and $P'_{i-1}$. This "error" value, $\Delta$, is used as an address to a look-up table (LUT) 110. LUT 110 is a look-up table to compute an inverse quantized value. LUT 110 can store both a quantized value and an inverse quantized value for a given $\Delta$ or error. The LUT 110 outputs a "recovered" error value $\Delta'$ to be used in error recovery circuit is shown in FIG. 1.

The recovered error value $\Delta'$ output by LUT 110 is the result of both quantization and inverse quantization. For instance, an error value $\Delta=96$ may have a quantized value of 12. The quantized value 12, when inverse quantized will yield a recovered error $\Delta'$, for example, of 98. It is this quantization loss that facilitates compression. The quantization formula which is used to compile the look-up table may result in many values such as 96 and 98 as well, mapping to a quantized value of 12. When inverse quantized, the value 12 will always yield, in the example given above, an inverse quantized value of 98, whether "12" was obtained from quantizing an error value of 96 or 98.

This error, which is due to quantizing error values to a smaller set of values can potentially propagate through the entire row of pixels unless a recovery mechanism is applied. Error recovery circuit 15 seeks to reduce the propagation of error by feeding back and summing previous predicted pixel component values with future recovered error values $\Delta'$ for future predicted pixel components.

The summation circuit 160 sums together the recovered error $\Delta'$ with $P'_{i-1}$ which is the previous predicted pixel. The sum is input to a register block 170, which stores and holds the value $\Delta'+P'_{i-1}$ until the next $\Delta'$ is ready to be summed. The previous predicted pixel component $P'_{i-1}$ is also input to difference circuit 100 to be subtracted from the actual pixel component $P_i$. Error recovery circuit 15, which consists of summation circuit 160 and register block, is essentially the decompression or inverse of the forward image compression process. Hence, instead of taking the original input pixel component values for prediction calculation, the decompressed (inverse-quantized) pixel components are used to calculate the next subsequent predicted values. This simulates the prediction occurring at the receiver side (i.e., during decompression). As a result, the quantization error for each component remains localized for the particular pixel.

As mentioned above, predictive coding circuit 10 generates an error value $\Delta$ for each pixel component $P_i$. A second LUT 120 is employed to perform quantization and encoding in an integrated manner. Again, for example, a $\Delta=96$ may have a quantized value of 12. LUT 120 will store the full range of possible $\Delta$ values as addresses to index the quantized value and its keyword (encoded).

A third LUT 130 stores length information and assuming an 8-bit pixel component, will utilize 4 bits to provide the size of each codeword. The codeword, provided by LUT 120 is a binary encoded equivalent of the quantized value for a particular error value $\Delta$. By using both the size information from LUT 130 and the binary codeword provided by LUT 120, a packing circuit 150 can arrange and sequence codewords for data transmission to other components or devices. The codewords sent out by the packer circuit contain sufficient information to represent a compressed image and can later be decompressed to recover a slightly modified version of the original captured image sent to the predictive coding circuit as the set of $P_i$ values for the entire image.

In the example of FIG. 1, one-dimensional predictive coding using the west neighboring pixel components is utilized. Thus, the very first pixel component $P_1$ of a particular row j has no previous predicted pixel component $P_0'$ since no west neighbor exists for $P_1$. Therefore, $P_1$, the first pixel of every row, should be provided directly to the packer circuit to be encoded as is. To facilitate this operation, a multiplexer 140 selects the codeword provided by LUT 120 for all pixels in a row after $P_1$ and selects $P_1$ when the very first pixel component is to be encoded. The value selected by multiplexer 140, either the codeword from LUT 120 or $P_1$, is packed by packing circuit 150. Table 1 below shows values for an exemplary first four pixel components of a row, $P_1$, $P_2$, $P_3$ and $P_4$.

TABLE 1

|       | i = 1 | i = 2 | i = 3 | i = 4 |
|-------|-------|-------|-------|-------|
| $P_i$ | 96    | 13    | 9     | 104   |
| $\Delta$ | 96 | −83   | −3    | 96    |
| $\Delta'$ | 96 | −84 | −4    | 98    |
| $P'_i$ | 96   | 12    | 8     | 106   |

The first pixel component $P_1$ has a value of 96. A value of 0 is fed into difference circuit 100 from register block 170 which is cleared when a new pixel row is operated upon. Thus, each of the values for the first pixel, $\Delta$, $\Delta'$, and $P'_{i-1}$ are also 96. P' is not actually output until i=2.

The next pixel component P2 has a value of 13. The $\Delta$ is $P_2-P'_1=13-96=-83$. $\Delta'$ is the inverse quantized value, which estimates the value −83 to, for example, −84. $P'_2$ is $\Delta'+P'_1=-84+96=12$. In a similar manner, the values shown for i=3, 4 and so forth may be arrived at.

In one alternate embodiment, two-dimensional predictive coding may be used instead of one-dimensional coding. Two-dimensional predictive coding will utilize both the north and west neighboring pixels, and though the look-up table approach will be similar, the feedback circuitry will vary. Such a two-dimensional predictive coding system is shown in FIG. 5 below.

The predictive coding circuit 10 performing the above computation is advantageous in that a look-up table, namely LUT 110, is utilized. Such a look-up table greatly simplifies the predictive coding circuit by combing functions with ASICs and other specialized, and more complicated circuitry. The LUT 110 may consist of two columns such as shown below in Table 2:

TABLE 2

| $\Delta$ | $\Delta'$ |
|----------|-----------|
| 97       | 98        |
| 96       | 98        |
| 95       | 98        |
| .        | .         |

TABLE 2-continued

| Δ | Δ' |
|---|---|
| . | . |
| . | . |
| . | . |
| 0 | 0 |
| . | . |
| . | . |
| . | . |
| −83 | −84 |
| −84 | −84 |

The LUT 110 can therefore be a simple addressable memory such as a RAM which uses a value Δ as an address to look-up the corresponding value Δ'. Such a RAM look-up table is inexpensive in comparison to quantization and inverse quantization circuitry that would be traditionally utilized to perform the same functionality. In applications, such as still image capture with a portable digital camera, the quantization and inverse quantization may be compiled well in advance and the same table of values utilized for all images captured.

Additionally, the image compression apparatus shown in FIG. 1 is further advantageous in that the complicated procedure of binary/codeword encoding is avoided. In binary/codeword encoding, a value is represented in some binary form, such as one's complement and is also further coded using a coding scheme such as the well-known Huffman coding. Such coding is executed bitwise, and thus, may utilize latches and logic gates implemented in CMOS. Even more complex than binary/codeword encoding is the procedure of quantizing. Quantizing involves mapping a first set of values to a smaller set of values. In image compression, quantization is achieved according to various formulas, which while readily computable by a data processing system, are too complex for small, portable imaging systems. Imaging systems, such as digital cameras would need to be able to compute formulas representing visual response, etc. which may be quite mathematically rigorous. Not only must the camera compute such formulas, which relates an error or delta value x and the quantized value y, but it should do so on-the-fly in a quick and efficient manner so that compression is fast. Fast compression allows the digital camera to "snap" the next picture, i.e., capture the next image without too much delay. Again, while a computer system may be able, with its processing power and perhaps dedicated video compression chips, to compress images in a short time, a digital camera if it is to be portable, and cost-effective, is less able to do so. Thus, the focus of image compression still cameras should be in reducing the number and complexity of processing steps. A precompiled look-up table, according to the various embodiments and modifications thereof of the invention, can achieve this end.

Figure 2:
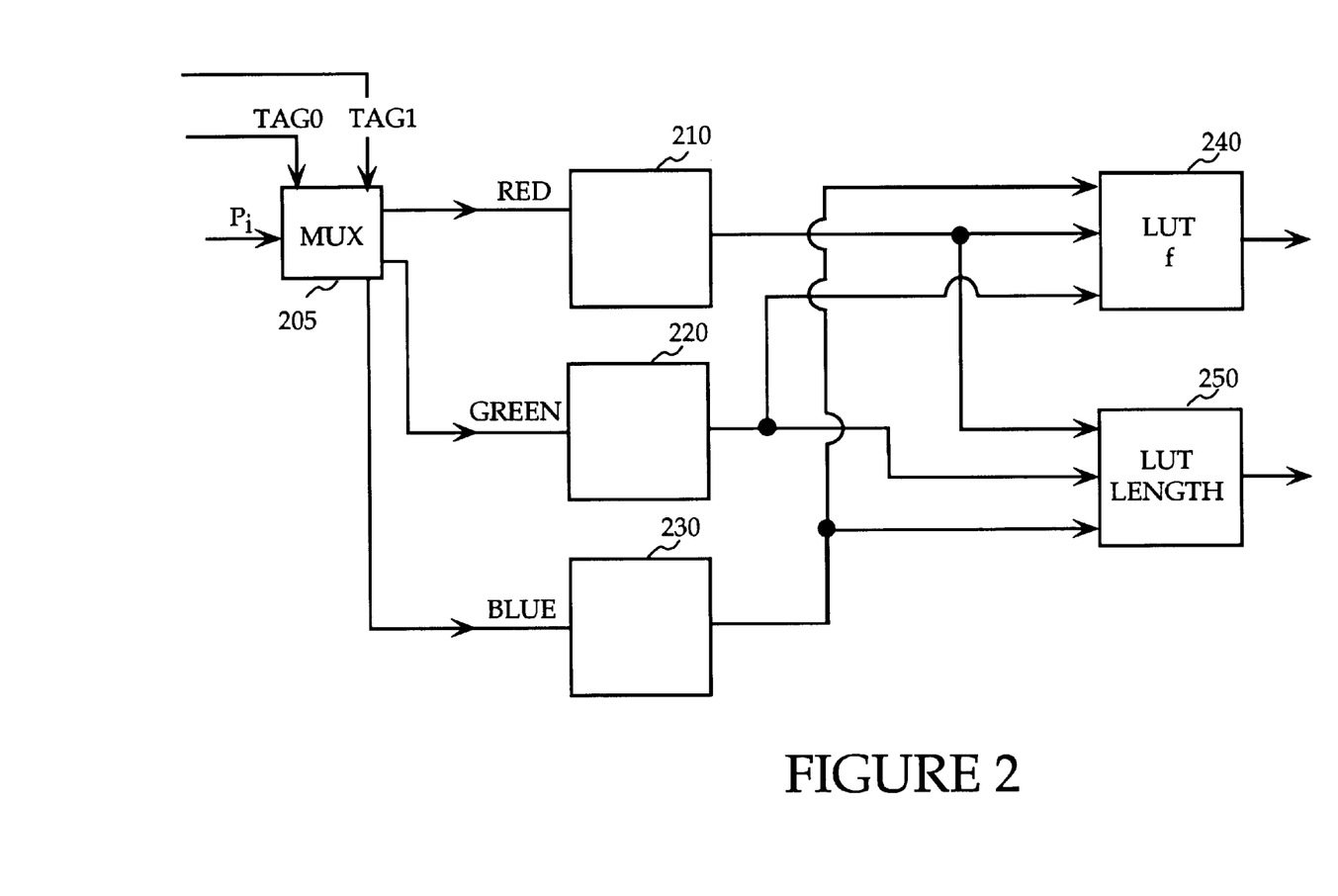
FIG. 2 is a block diagram according to a second embodiment of the invention.

FIG. 2 is a block diagram according to a second embodiment of the invention.

FIG. 2 shows a pipelined architecture for performing image compression. The predictive coding circuit 10 shown in FIG. 1 is preferably intended to work on a "component" (R, G or B) of a pixel. In this regard, FIG. 2 shows a first predictive coding circuit 210 which is similar to the predictive coding circuit 10 of FIG. 1 and operates upon the R or red color plane component of the pixel. Likewise, a second predictive coding circuit 220 is shown which operates on the G or green color plane component, and a third predictive coding circuit 230 is shown operating upon the B or blue color plane component of a pixel. In this embodiment, a multiplexer 205 is provided to select one of three output lines on which to place the incoming pixel component. Two select lines, a TAG1 and TAG0 are utilized to use the two-bit tag information to route the component accordingly. As discussed below, the ordering of pixel components will allow them to be properly mixed during decompression. Also, this embodiment ensures that predictive coding is performed separately for each color component. Red error values are predicted from Red error values, Green from Green, and so on. This aids the occurring of predictive coding by matching "colors" when predicting. The multiplexer may be avoided if there are separate R, G and B sensors for detecting different pixel components. Advantageously, such a system would be able to simultaneously process more than one component. Each predictive coding circuit 210, 220 and 230 is capable of accessing a single set of LUT's, a first LUT "f" 240 and a second LUT "Length" 250. As described in FIG. 1, LUT 240 is a RAM or other memory look-up table which accepts as an indexing address, an error value generated by the predictive coding circuit. Using this address, the precompiled LUT 240 is able to provide a codeword equivalent which implicitly contains a two-step quantization and encoding process. LUT 250 provides for each indexing address, which is an error value provided by the predictive coding circuit, length information indicating the total number of bits of each codeword for the packing circuit.

Each predictive coding circuit can, alternatively, be configured to simultaneously index LUT 240 as well as LUT 250 so that the processing of color plane components of a single pixel need not be pipelined, but can occur in true parallel fashion. This is made possible since in most traditional image sensing, the R, G and B components are assigned an even number of bits when sensed. In systems where this is not the case the parallel architecture may be modified to include LUTS that have three separate sub-tables, one for each component, or the components can be converted to have an equal number of bits. However, with, for example, an imaging system producing 8-bit R, 8-bit G and 8-bit B components, a single table of length $2^{N+1}-1$ will suffice to provide codewords for all possible error values (in the range −255 to +255). The same principle holds true for the length LUT.

Though no separate tables are needed for each color plane component, it is important to identify, for each component error value, whether that value represents the sensor capture or input R, G or B component. This is desired so that upon reconstruction of the pixel and rastering to a display, printer or other output device, as well as for storage on the capture device itself, it will be possible to "mix" the R, G and B components correctly to compose the final color intensity of the pixel. For instance, if the blue (B) component value were utilized for predicting red (R), the resulting mixed color might incorrectly represent the original color of the image upon decompression. To ensure proper combination, the packer can arrange, in any desired order, the R, G and B codewords, by using "TAG" information which accompanies the error value provided by each predictive coding circuit. The TAG information (TAG0 and TAG1), are simply a sequence of two bits identifying R, G, or B and is passed through without change at the output of the LUTs. The TAG information can initially be stripped and passed along a separate signal line so as not to complicate the indexing process.

In one embodiment, when pixels are forwarded out of an image sensor, the ordering of the pixels follows a particular pattern such as the Bayer pattern which is well-known in the art, and shown below:

| Row 0 | R  | G1 | R  | G1 | R  | G1 |
|-------|----|----|----|----|----|----|
| Row 1 | G2 | B  | G2 | B  | G2 | B  |
| Row 2 | R  | G1 | R  | G1 | R  | G1 |
| Row 3 | G2 | B  | G2 | B  | G2 | B  |

The exemplary Bayer pattern shown above shows that each even row consists alternately red pixels (R) and green pixels (G1—even-row Greens) only which are tagged by 00 (R) and 01 (G), respectively, to be recognized by the packer. Similarly, the odd rows consists alternatively A and B pixels only which are similarly tagged by 10 (G2—odd-row Greens) and 11 (B), respectively. The packer unit alternately packs the codewords of R and G1 pixels in an even row and G2, B in odd row. The tags are used to identify the color of the codeword. This tag is not actually included into the packed bit stream. Note that the green pixels in odd and even rows are treated differently and hence, they are identified as G1 and G2 and tagged 01 and 10, respectively.

The parallel architecture of FIG. 2 fully utilizes the advantages of LUT-based image compression by using only a set of two tables to process all three color plane components. One feature of such a predictive coding image compression scheme is the absence of color conversion. The scheme does not rely upon a particular color space. Since the imaging sensor of digital cameras operates on an R, G, B component principle, the image compression can be performed R, G, B with no conversion to any other color format like YUV (Y-luminance, U-color, V-chrominance) or CMYK (Cyan, Magenta, Yellow, Black), for example.

Figure 3:
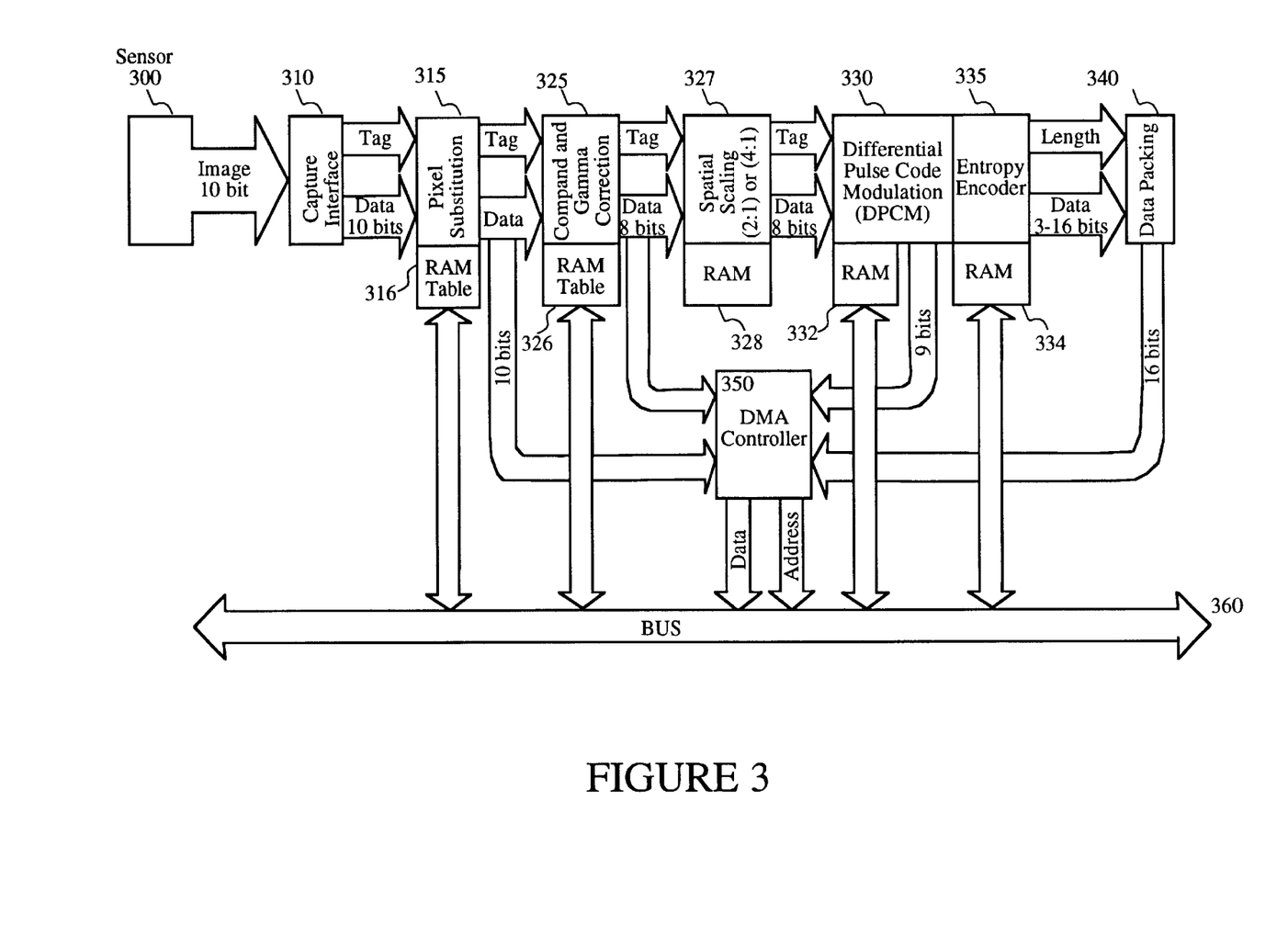
FIG. 3 is a diagram according to a third embodiment of the invention.

FIG. 3 is a diagram according to a third embodiment of the invention.

FIG. 3 is a block diagram of internal image processing and compression components of an image capture device. A sensor 300, such as CMOS or CCD sensor generates pixel components which are color/intensity values from some source. The 10-bit pixel values generated by sensor 300 are sent to a capture interface 310. Sensor 300 in the digital camera application, will typically sense either R, G, or B components from one "sense" of an area or location. These components can be interpolated together to form higher-order (16-bit, 24-bit, etc.) composite pixels when reconstructed for display or output purposes. Capture interface 310 captures the image generated by the CMOS sensor and appends TAGs identifying color components for the pixels with individual pixels. The TAGs are two bits each, for example, 00, 01, 10 and 11 for R (Red), G1 (even-row Green), G2 (odd-row Green), B (Blue) pixels, respectively.

The ordering of pixels and the relevance of G1 and G2 is described above with respect to FIG. 2 and associated description. It is typical in any CMOS (Complementary Metal-Oxide Silicon) or CCD (Charge Coupled Device) sensor that some of the pixel cells in the sensor plane may not respond to the lighting condition properly. As a result, the pixel values generated from these cell may be defective. These pixels are called "dead pixels." The "pixel substitution" unit 315 replaces each dead pixel by the immediate previously valid pixel in the row.

A RAM table 316 consists of the row and column indices of the dead pixels, which are supplied by the sensor. This RAM table 316 helps to identify the location of dead pixels in relation to the captured image. Companding and gamma correction module 325 is a table look-up based converter to convert each original 10-bit (labeled 10b) pixel from the sensor to an 8-bit pixel value, by, for instance, interpolation.

In this architecture, companding and gamma correction has been integrated into a single table look-up operation. Gamma correction is required to achieve correct color luminance and contrast in the output display device. RAM table 326 accompanies compand and gamma correction module 325 and contains the entries of the companding table. For each color plane there are ($2^{10}=$) 1024 entries of 8 bits.

Next, a spatial scaling unit 327 is used to scale down the original image. If the original image size is M×N, the 2:1 scaling operation scales the image size down to M/2×N/2 and the 4:1 scaling operation scales it down to M/4×N/4. This allows for compaction of image which may be undersirably large. RAM 328 accompanies spatial scaling unit 327 and is used for intermediate storage during the scaling operation. For example, 4:1 scaling can be implemented by successively applying 2:1 scaling operation twice.

Once pixel component data is scaled, it is passed to a DPCM unit 330 and an entropy encoder 335. DPCM unit 330 and entropy encoder 335 are substantially less complex than in prior art imaging systems since RAM 332 and RAM 334 contains 4 information sufficient to performing quantization and binary encoding. Scaled pixel data is passed to DPCM unit 330 and entropy encoder 335 to generate error values which are then packed into codewords (refer to FIG. 1 for a detailed discussion). Entropy encoder 335, though shown in a separate block, is not actually "separate" from the DPCM unit 330, but integrated due to the table look-up. A RAM 332 which has quantization and codeword information and a RAM 334 which has the length of codewords are used to allow data packing unit 340, which is similar to packing circuit 150 of FIG. 1, to correctly arrange the codeword data which may be of variable length (3–16 bits) into byte units. Data packing unit 340 generates 16-bit codeword data and sends this to a DMA controller. The DMA controller can receive companded data from compand and gamma correction module 325, pixel substituted data from pixel substitution unit 315 and 9-bit quantization data from DPCM unit 330 for various purposes such as statistics, or sensor alignment, etc. This data should be of uniform length such that a bus 360 can transport data requested by other units, modules and devices connected over the bus. Importantly, also, the DMA controller 350 prepares the packed codeword data from data packing unit 340 to be communicated over bus 360 appropriately, with the right internal address such that the correct data reach the correct destination. Bus technology, addressing protocols and DMA controllers are well-known in the art of system design and can be readily modified/specialized to fit the desired application.

Each of the RAM tables 316, 326, 328, 332 and 334 can directly communicate with bus 360 so that their data can be loaded and then later, if desired, modified. By preloading data into those tables, especially for quantization and encoding, internal circuitry for mathematical computation is greatly reduced, and replaced with lower cost memory units.

Figure 4:
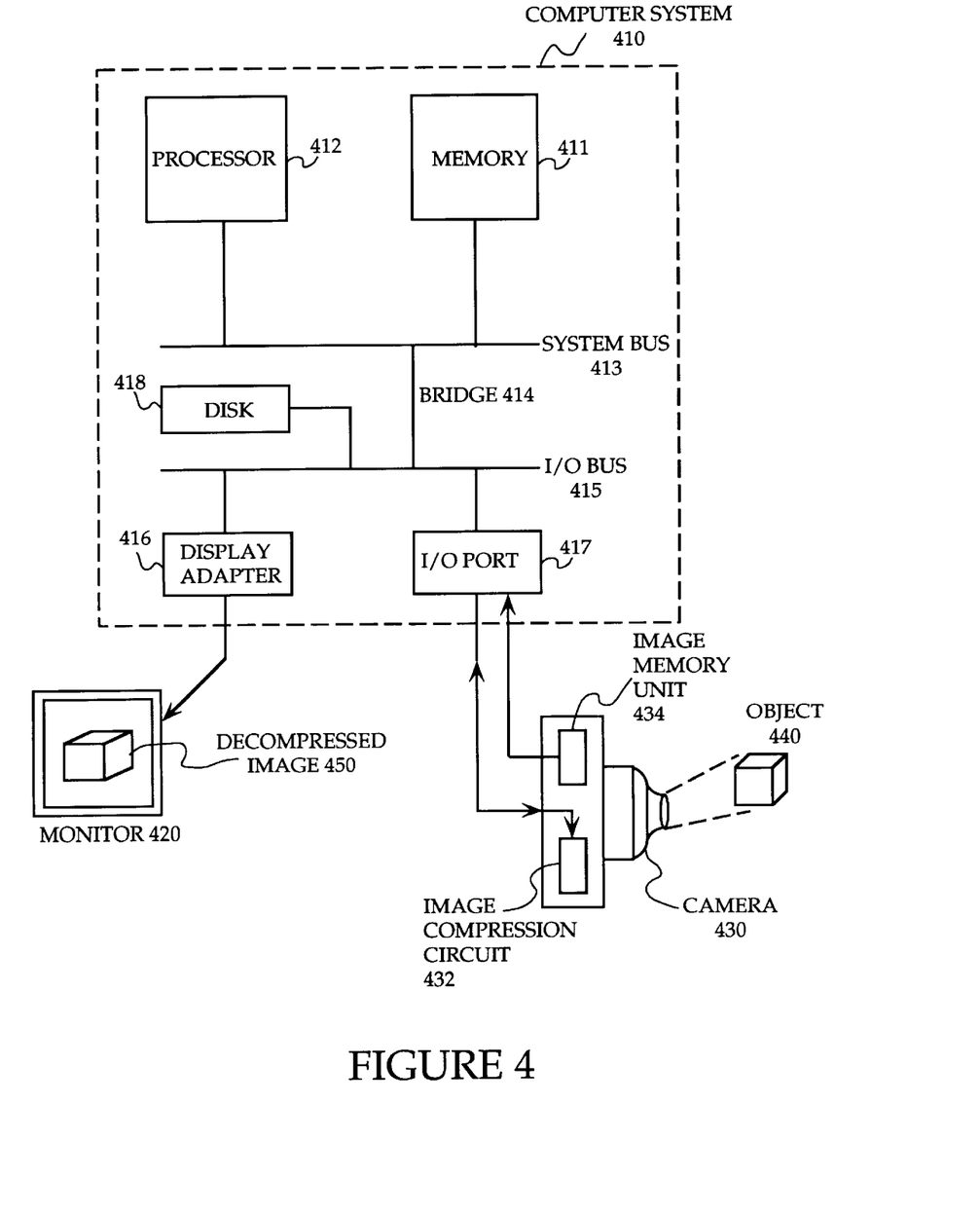
FIG. 4 is a system diagram of one embodiment of the invention.

FIG. 4 is a system diagram of one embodiment of the invention.

Illustrated is a computer system 410, which may be any general or special purpose computing or data processing machine such as a PC (personal computer), coupled to a camera 430. Camera 430 may be a digital camera, digital video camera, or any image capture device or imaging system, and is utilized to capture a sensor image of an object 440. Essentially, captured images are compressed by an image compression circuit 432 so that they can be efficiently stored in an image memory unit 434, which may be a ROM, RAM or other storage device such as a fixed disk. In most digital cameras, images are stored first and downloaded later. This allows the camera 430 to capture the next object quickly without additional delay.

Image processing in this embodiment of the invention operates as follows. First, an image compression table, if not already compiled, is compiled using computer system 410. The compiling of image compression tables according to desired quantization formulas or methods is achieved using a processor 412 such as the Pentium™ (a product of Intel Corporation) and a memory 411, such as RAM, which is used to store/load instruction addresses and result data. The application used to compile the image compression table may be an executable file compiled from source written in a language such as C++. The instructions of that executable file, which correspond with instructions necessary to compute quantized error values, codeword equivalents and index these and other values into a table, may be stored to a disk 418 or memory 411. It would be obvious to one of ordinary skill in the art to program a computing machine to compile the image compression table.

Computer system 410 has a system bus 413 which facilitates information transfer to/from the processor and memory and a bridge 414 which couples to an I/O bus 415. I/O bus 415 connects various I/O devices such as a display adapter 416, disk 418 and an I/O port 417, such as a serial port. Many such combinations of I/O devices, buses and bridges can be utilized with the invention and the combination shown is merely illustrative of one such possible combination.

Once the table is compiled, it can be sent through I/O port 417 and loaded into image compression circuit 432 as a RAM or memory utilized by the image compression circuit 432. The table, once loaded, can thereafter be utilized by the image compression circuit 432.

When an image, such as an image of object 440, is captured by a sensor, the sensor captures for each pixel one of R, G, or B components and these pixel values are then sent to the image compression circuit 432. Image compression circuit 432 consists of ICs and other components which execute an image compression scheme such as predictive coding. The image compression circuit 432 calculates initial error values according to a predictive coding formula, and then, looks up both the corresponding quantized error value and Codeword equivalent for the error value and stores that into the image memory unit 434. By looking up the values in the image compression table, the steps of computing quantization and bit-by-bit encoding do not have to be performed by the camera. The total cost of the camera is reduced by avoiding the additional circuitry used to perform quantization and encoding of error values. Once all pixel components are processed, the camera 430 can capture the next image. When the user or application desires/requests a download of images, the compressed images stored in the image memory unit as packed data (Codewords) and are transferred from image memory unit 434 to the I/O port 417. I/O port 417 uses the bus-bridge hierarchy shown (I/O bus 415 to bridge 414 to system bus 413) to temporarily store the Codeword pixels into memory 411 or, optionally, disk 418.

The compressed images are decompressed by suitable application software (or hardware), which may utilize processor 412 for its execution. Since the image compression table will have been compiled on the computer system, it can be reused to "look-up" in reverse the actual error value corresponding to the Codeword. The error values are used in an inverse predictive coding (or other corresponding image decompression scheme) to produce a decompressed image 450. Decompressed image 450 may then be rendered visually using a display adapter 416 onto a monitor 420 to which the computer system 410 may be connected. As discussed earlier, the decompressed image may have pixels which composite R, G and B values together by some method interpolation method and, thus, can produce higher-bit resolution images.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. An image compression apparatus comprising:
   a first look-up table configured to provide a quantized code upon being indexed by a single address;
   a second look-up table configured to provide the length of said code upon being indexed by said single address; and
   a predictive coding circuit coupled to said first look-up table and to said second look-up table, said predictive coding circuit generating said single address,
   a difference circuit, said difference circuit configured to generate said single address by difference said input pixel value and a predicted pixel value; and
   a third look-up table coupled to said difference circuit, said third look-up indexed by said single address to provide an inverse quantized code to said predictive coding circuit.

2. An apparatus according to claim 1 wherein said predictive coding circuit is configured to receive as input a pixel component value, said input causing said predictive coding unit to generate said single address.

3. An apparatus according to claim 1 further comprising a packer circuit coupled to outputs of said first look-up table and said second look-up table, said packer circuit configured to arrange said size information and said quantized code into a single data unit.

4. An apparatus according to claim 1 wherein said predictive coding circuit comprising an error recovery circuit coupled to said third look-up, said error recovery circuit configured to receive said inverse quantized code.

5. An apparatus according to claim 4 wherein said error recovery circuit comprises a summation circuit, said summation circuit configured to add said inverse quantized code with a previous predicted pixel component.

6. An apparatus according to claim 5 comprising a register block coupled to said summation circuit said register block configured to hold output of said summation circuit.

7. An image compression apparatus comprising:
   a first look-up table configured to provide for each address a quantized code;
   a second look-up table configured to provide for said each address size information of said quantized code;
   a first predictive coding circuit communicating with said first look-up table and said second look-up table, said first predictive coding circuit providing an address to said first look-up table and said second look-up table, said address a signal responsive to an error value for a pixel in its red color plane component;
   a second predictive coding circuit communicating with said first look-up table and said second look-up table, said first predictive coding circuit providing an address to said first look-up table and said second look-up table, said address a signal responsive to an error value for a pixel in its green color plane component;

a third predictive coding circuit communicating with said first look-up table and said second look-up table, said first predictive coding circuit providing an address to said first look-up table and said second look-up table, said address a signal responsive to an error value for a pixel in its blue color plane component; and a third look-up table configured to provide an inverse quantized code for each address, said inverse Quantized code utilized in error recovery.

8. An image compression apparatus according to claim 7 comprising a multiplexer configured to select one which one of said predictive coding circuits is to be utilized for a given input to said image compression apparatus.

9. A system for imaging comprising:

an image compression circuit configured to receive pixel components of a captured image, said image compression circuit achieving quantization and encoding by utilizing look-up tables, including a look-up for an inverse quantized code utilized in error recovery; and an image memory unit coupled to said image compression circuit to receive compressed images therefrom.

10. A system according to claim 9 wherein said image compression circuit and said image memory unit ones are disposed within an image capture device.

11. A system according to claim 10 wherein said image capture device is for coupling to a computer system, said computer system configured to display said images, and configured to provide data to said look-up tables.

* * * * *

UNITED STATES PATENT AND TRADEMARK OFFICE
CERTIFICATE OF CORRECTION

PATENT NO. : 6,694,061 B1 Page 1 of 1
DATED : February 17, 2004
INVENTOR(S) : Acharya It is certified that error appears in the above-identified patent and that said Letters Patent is hereby corrected as shown below:

<u>Column 3,</u>
Line 14, before "generates", insert -- 100 --.

Signed and Sealed this

Fifteenth Day of June, 2004

JON W. DUDAS
*Acting Director of the United States Patent and Trademark Office*